United States Patent
Deming et al.

(10) Patent No.: US 6,818,732 B2
(45) Date of Patent: Nov. 16, 2004

(54) TRANSITION METAL INITIATORS FOR CONTROLLED POLY (BETA-PEPTIDE) SYNTHESIS FROM BETA-LACTAM MONOMERS

(75) Inventors: Timothy J. Deming, Summerland, CA (US); Jianjun Cheng, Arcadia, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/232,049

(22) Filed: Aug. 30, 2002

(65) Prior Publication Data

US 2003/0083460 A1 May 1, 2003

Related U.S. Application Data

(60) Provisional application No. 60/316,834, filed on Aug. 30, 2001.

(51) Int. Cl.$^7$ ................................................ C08G 69/14
(52) U.S. Cl. ........................ 528/328; 528/310; 528/312; 528/323; 528/324; 528/329.1; 525/420
(58) Field of Search .................................. 528/310, 312, 528/323, 324, 329.1, 328, 342, 363; 525/420

(56) References Cited

U.S. PATENT DOCUMENTS

| 5,395,811 | A | * | 3/1995 | Novak et al. | ................ | 502/152 |
| 5,525,688 | A | * | 6/1996 | Novak et al. | ................ | 526/135 |
| 6,335,420 | B1 | * | 1/2002 | Bruening et al. | ............ | 528/266 |
| 6,506,577 | B1 | * | 1/2003 | Deming et al. | ............ | 435/68.1 |
| 6,750,312 | B1 | * | 6/2004 | Harris et al. | ................ | 528/170 |

OTHER PUBLICATIONS

Cheng, J. et al. "Controlled Polymerization of β–Lactams Using Metal–Amido Complexes: Synthesis of Block Copoly(β–peptides)," *J. Am. Chem. Soc.* 123(38): 9457–9458 (2001).

Vives, J. et al. "A novel synthesis of poly(α–isobutyl–L–aspartate)," *Makromol. Chem., Rapid Commun.* 10:13–17 (1989).

Lopez–Carrasquero, F. et al. "Poly(α–n–alkyl–L–aspartate)s: a new family of helical nylons," *POLYMER* 35(21):4502–4510 (1994).

Rodriguez–Galan, A. et al. "Synthesis of Poly–β–(α–Benzyl–L–Aspartate) from L–Aspartic β–Lactam Benzyl Ester (3®–Benzoxycarbonyl–2–Azetidinone)," *Makromol. Chem., Macromol. Symp.* 6:277–284 (1986).

Garcia–Alvarez, M. et al. "Solvent polarity effects on the anionic polymerization of 4–(S)–isobutoxycarbonyl–2–azetidinone," *Makromol. Chem. Rapid Commun.* 13:173–178 (1992).

Ramirez, R. et al. "Synthesis and structure of random and block copoly(β,L–aspartate)s containing short and long alkyl side chains," *POLYMER* 41:8475–8486 (2000).

Sebenda, J. et al. "Living Polymerization of Lactams and Synthesis of Monodisperse Polyamides," *Polymer Bulletin*.

* cited by examiner

*Primary Examiner*—P. Hampton Hightower
(74) *Attorney, Agent, or Firm*—Fulbright & Jaworski

(57) ABSTRACT

A series of initiators based on transition metal complexes for the polymerization of optically active beta-lactams into poly-beta-peptides and block copolymers have been developed. These initiators are unique in being able to eliminate chain transfer and chain termination side reactions from these polymerizations resulting in narrow molecular weight distributions, molecular weight control, and the ability to prepare copolymers of defined block sequence and composition.

40 Claims, 6 Drawing Sheets

TRANSITION METAL INITIATORS FOR CONTROLLED POLY (BETA-PEPTIDE) SYNTHESIS FROM BETA-LACTAM MONOMERS

CROSS-REFERENCE TO RELATED APPLICATIONS

This application claims the benefit of the U.S. Provisional Patent Application Ser. No. 60/316,834 fled Aug. 30, 2001.

STATEMENT REGARDING FEDERALLY FUNDED RESEARCH

This invention was made with Government support under Grant Nos. CHE 9701969 and DMR-9632716 awarded by the National Science Foundation. The Government has certain rights in this invention.

BACKGROUND

The synthesis and characterization of oligomers of β-amino acids, named β-peptides, has received considerable interest in recent years.[1-4] We have been interested in the preparation of poly(β-peptides) to compare these materials with poly(α-peptides) and extend the homologue comparison to polymeric materials.[5] Poly(β-peptides) have been prepared via condensation of short peptide sequences,[6-9] polymerization of β-aminoacid-N-carboxyanhydrides,[5,10-12] and polymerization of β-lactams.[13-17] The first two methods involve tedious monomer preparations and yield only low molecular weight oligomers. However, the ring-opening of β-lactams has been shown to yield high molecular weight polymers in certain cases.[13-17] These polymerization reactions are not optimized in that chain length is difficult to control, and side reactions such as imide formation, racemization of chiral centers, and branching lead to heterogeneous products and low yields.[14-17]

The polymerization of β-lactams was first reported by Bestian,[13a] who prepared high molecular weight poly(β-peptides) from racemic monomers bearing small alkyl side-chains. Functional side-chains, similar to those found on natural amino acids, would be more desirable since they can impart biological activity to β-peptides. In this area, Munoz-Guerra and coworkers have reported considerable studies on poly(α-alkyl-β-aspartates),[14] taking advantage of the availability of L-aspartic acid, the only naturally occurring proteinogenic β-amino acid. The β-lactams of aspartic acid esters were polymerized anionically using initiators such as sodium pyrrolidone or sodium hydride (eq 1).

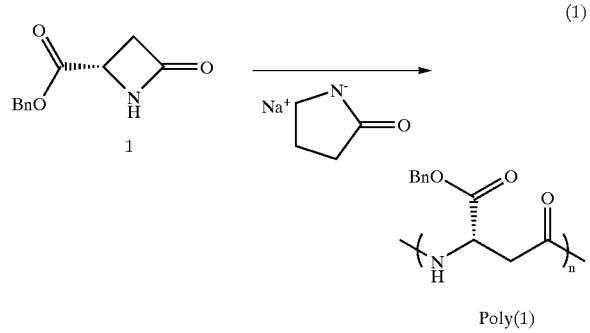

Under certain conditions, racemization and the formation of imide linkages could be minimized, however chain lengths could not be controlled by monomer to initiator stoichiometry, and monomer conversions were typically seldom greater than 80%.[14] The best reported control in β-lactam polymerizations was obtained by Sebenda who was able to prepare narrow molecular weight distribution, low molecular weight poly(β-peptides) via anionic β-lactam polymerization using an N-acyl lactam activator.[17] In addition to requiring α,α-dialkyl substituted monomers, these were not living polymerizations since proton transfer from backbone amide groups was found to deactivate the growing chains.[17] Hence, branched polymers were obtained and block copolymers could not be prepared.

SUMMARY

Recently, we have had success using metal catalysis to obtain well-defined block copolymers of α-amino acids that display useful properties.[18] We now report the discovery that certain metal-amido complexes can initiate the living polymerization of β-lactams to give poly(β-peptides) and block copoly(β-peptides) with controllable chain lengths and narrow molecular weight distributions.

A series of initiators based on transition metal complexes for the polymerization of optically active beta-lactams into poly-beta-peptides and block copolymers have been developed. These initiators are substantially different in nature from all known conventional initiators used to polymerize beta-lactams and are also unique in being able to control these polymerizations so that block copolymers of beta-amino acids can be prepared. Specifically, these initiators eliminate chain transfer and chain termination side reactions from these polymerizations resulting in narrow molecular weight distributions, molecular weight control, and the ability to prepare copolymers of defined block sequence and composition. They also eliminate the formation of imide linkages in the polymers during polymerization of beta-lactams, a common detriment in conventional polymerization of these monomers. The features provided by these initiators allow the preparation of complex poly-beta-peptide biomaterials having potential applications in medicine (drug delivery, therapeutics, tissue engineering), as "smart" hydrogels (responsive organic materials), and in organic/inorganic biomimetic composites (artificial bone, high performance coatings).

DETAILED DESCRIPTION OF THE INVENTION

Figure 1:
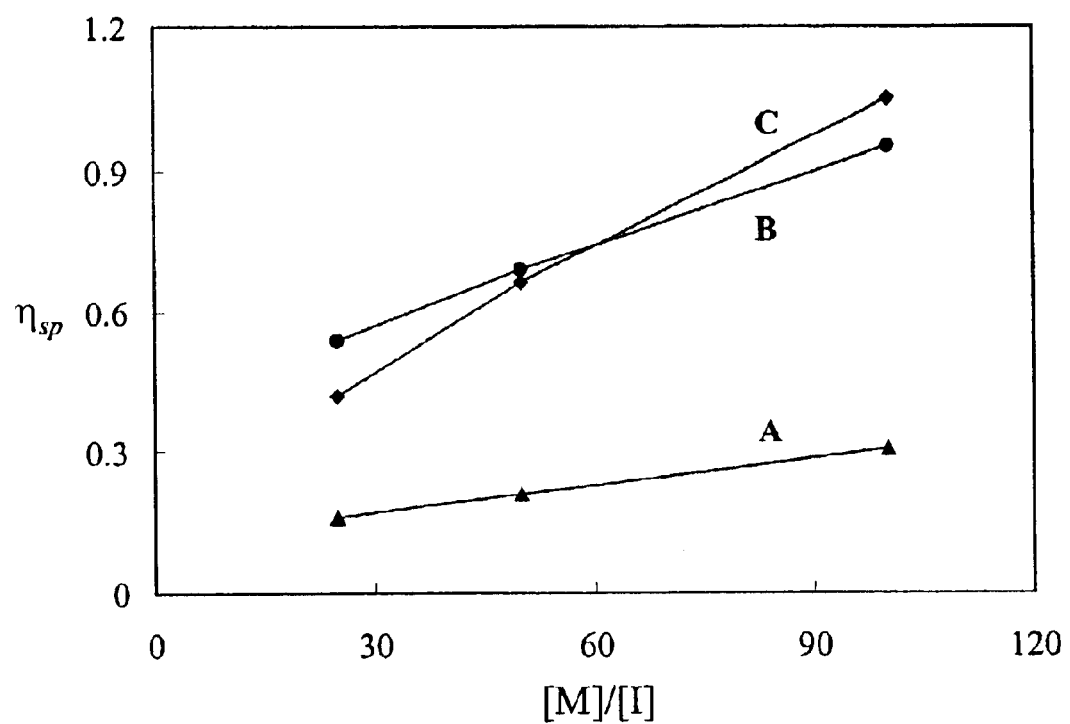
FIG. 1 shows the specific viscosities of poly(β-peptides) as functions of monomer to initiator ratio for different initiators. All polymerizations were carried out at 20° C. in $CH_2Cl_2$ at an initial concentration of the β-lactam of α-benzyl-L-aspartic acid [1]=0.02 M. [M]/[I]=initial [1]/[initiator]. Specific viscosities were measured in dichloroacetic acid solution ([poly(1)]=0.165 g/dL) at 25.0±0.1° C. using an Ubbelohde type capillary viscometer. A=poly(1) prepared using $Sc(N(TMS)_2)_3$; B=poly(1) prepared using $BDIMgN(TMS)_2$; C=poly(1) prepared using DepeNiAA.

Based upon the success of amido-containing metallacycles as initiators for poly(α-peptide) synthesis,[18b] we explored the potential of using metal-amido complexes to control β-lactam polymerizations We screened a number of known metal-amido complexes and sodium pyrrolidone for their ability to initiate and control polymerization of (S)-4-(Benzyloxycarbonyl)-2-azetidinone (1) (Tables 1 and 2). From these studies, it appeared that most of these complexes were efficient initiators, although polymerization activity varied widely among the different complexes.

Methods and Compostions for Making Poly(β-Peptides)

One embodiment of the present invention is a method of making a poly (β-peptide). In this method beta lactam monomers are combined with a transition metal complex for a time and under conditions effective to polymerize the beta lactam monomer and to form the poly (β-peptide).

Another embodiment of the present invention is a composition, which includes key components of the reaction mixture used in making poly (β-peptides). Such compositions will typically include the beta lactam monomers and a transition metal complex comprising a transition metal and a nucleophilic ligand.

We conducted beta-lactam polymerization studies with a variety of transition metal complexes. The most important parameter for identifying a suitable initiator was control over polymer chain length as functions of both monomer conversion and stoichiometry of monomer to initiator.[19]

A variety of transition metal complexes have been found by us to give controlled polymerizations of beta-lactams. These results are summarized in Tables 1 and 2. Different metal centers and ligands combinations can be used to substantially alter the polymerization rate and the relative degree of polymerization (it appears that with some metal complex initiators, chain initiation is less than 100% efficient, yet there are little or no chain breaking reactions during chain growth). In nearly all cases, poly beta-peptide chain length (as estimated by polymer viscosity in dichloroacetic acid (DCA)) can be controlled by the monomer to initiator stoichiometry.

TABLE 1

POLYMERIZATION OF (S)-4-BENZYLOXYCARBONYL-2-AZETIDINONE (1) USING TRANSITION METAL INITIATORS

| Initiator (I) | [M]/[I] | Solvent | Conc. (M) | Reaction Time (h) | Yield (%) | Comments |
|---|---|---|---|---|---|---|
| DEPENiAA | 25 | $CH_2Cl_2$ | 0.02 | 12 | 100 | ηspa = 0.45 |
| DEPENiAA | 50 | $CH_2Cl_2$ | 0.02 | 12 | 100 | |
| DEPENiAA | 100 | $CH_2Cl_2$ | 0.02 | 24 | 99 | ηsp = 0.45 |
| Co(PMe$_3$)$_4$ | 25 | $CH_2Cl_2$ | 0.02 | 3 | 100 | ηsp = 0.42[η]b = 1.61 |
| Co(PMe$_3$)$_4$ | 50 | $CH_2Cl_2$ | 0.02 | 10 | 100 | ηsp = 0.659, [η] = 2.22 |
| Co(PMe$_3$)$_4$ | 100 | $CH_2Cl_2$ | 0.02 | 12 | 99 | ηsp = 1.051, [η] = 3.66 |
| Co(PMe$_3$)$_4$ | 200 | $CH_2Cl_2$ | 0.02 | 24 | 95 | |
| | | | | Quench | | Polymerizations vs. % conversion |
| Co(PMe$_3$)$_4$ | 100 | $CH_2Cl_2$ | 0.02 | 0.5 | 5 | Polymer isolated as powder Polmerization solution least viscous |
| Co(PMe$_3$)$_4$ | 100 | $CH_2Cl_2$ | 0.02 | 1.5 | 10 | Polymer isolated as powder |
| Co(PMe$_3$)$_4$ | 100 | $CH_2Cl_2$ | 0.02 | 5 | 51 | Polymer isolated as long fiber |
| Co(PMe$_3$)$_4$ | 100 | $CH_2Cl_2$ | 0.02 | 8 | 86 | Polymer isolated as long fiber, polymerization solution most viscous |
| Zn(NTMS)$_2$ | 5 | $CH_2Cl_2$ | 0.1 | 24 | 98 | Low viscosity, slow reaction |
| Zn(NTMS)$_2$ | 100 | $CH_2Cl_2$ | 0.1 | 72 | 65 | Viscous, slow reaction |
| Pt(PEt$_3$)$_4$ | 25 | $CH_2Cl_2$ | 0.1 | 0.3 | 99 | Very fast polymerization, similar to BDI-Mg—N(TMS)$_2$, solution very viscous |
| BDI-Mg—N(TMS)$_2$ | 5 | $CH_2Cl_2$ | 0.02 | 0.1 | 100 | ηsp = 0.196, slightly pink colored |
| BDI-Mg—N(TMS)$_2$ | 25 | $CH_2Cl_2$ | 0.02 | 0.1 | 100 | ηsp = 0.536 |
| BDI-Mg—N(TMS)$_2$ | 100 | $CH_2Cl_2$ | 0.02 | 0.3 | 100 | ηsp = 0.949 |
| Sc(NTMS)$_2$)$_3$ | 25 | $CH_2Cl_2$ | 0.02 | 4 | 100 | ηsp = 0.159, reaction solution viscosity increases with conversion |
| Sc(NTMS)$_2$)$_3$ | 100 | $CH_2Cl_2$ | 0.02 | 12 | 98 | ηsp = 0.304, reaction solution viscosity increases with conversion |
| Cr(N(TMS)$_2$)$_3$ | 25 | $CH_2Cl_2$ | 0.02 | 48 | 15 | Reaction incomplete, very slow polymerization |
| Cr(N(TMS)$_2$)$_3$ | 100 | $CH_2Cl_2$ | 0.02 | 48 | 8 | Reaction incomplete, very slow polymerization |
| Cr(N(TMS)$_2$)$_3$ | 25 | THF | 0.02 | 12 | 75 | Polymerization much faster than that in $CH_2Cl_2$, polymer stays in solution |
| Cr(N(TMS)$_2$)$_3$ | 100 | THF | 0.02 | 12 | 47 | Reaction incomplete, polymer precipitates from THF during polymerization |
| Co(N(TMS)$_2$)$_2$ | 50 | $CH_2Cl_2$ | 0.02 | 24 | 98 | Similar to Co(PMe$_3$)$_4$ |
| Ru-Amido Complex | 25 | $CH_2Cl_2$ | 0.1 | 48 | 76 | Reaction incomplete | a Polymer concentration = 21.4 mg polymer in 13 mL DCA solution, 25 ± 0.1° C.
b Data (average of three measurements) collected between ηspP = 0.1–0.5 in DCA solution, 25 ± 0.1° C.
Abbreviations: DEPENiAA = (1,2-(CH$_3$CH$_2$)$_2$P)CH$_2$CH$_2$)Ni(NHCH(CH(CH$_3$)$_2$)C(O)NH$_2$C(CH$_3$)$_3$).
TMS = (CH$_3$)$_3$Si—,
BDI = 2-((2,6-diisopropylphenyl)amido)-4-((2,6-diisopropylphenyl)imino)-2-pentene).
Ru-Amido complex = (para-cymene)Ru(NHCH$_2$CH$_2$NS(O)$_2$C$_6$H$_5$CH$_3$).

TABLE 2

POLYMERIZATION OF 1 USING TRANSITION METAL INITIATORS.

| Initiator | Solvent | [M]/[I]$^a$ | [M]$^b$ | Time (hr) | Yield (%)$^c$ |
|---|---|---|---|---|---|
| Sodium 2-pyrrolidone | CH$_2$Cl$_2$ | 100 | 0.02 | 0.1 | 64 |
| DepeNiAA$^d$ | CH$_2$Cl$_2$ | 100 | 0.02 | 24 | 99 |
| DepeNiAA | DMF | 100 | 0.02 | 24 | 0 |
| DepeNiAA | CH$_3$CN | 100 | 0.02 | 24 | 53 |
| DepeNiAA | THF | 100 | 0.02 | 24 | 47 |
| Co(N(TMS)$_2$)$_2$ | CH$_2$Cl$_2$ | 50 | 0.02 | 24 | 98 |
| Mg(N(TMS)$_2$)$_2$ | CH$_2$Cl$_2$ | 100 | 0.02 | 0.2 | 100 |
| BDIMgN(TMS)$_2$$^e$ | CH$_2$Cl$_2$ | 100 | 0.02 | 0.3 | 100 |
| Sc(N(TMS)$_2$)$_3$ (2) | CH$_2$Cl$_2$ | 100 | 0.02 | 12 | 98 |
| Cu(N(TMS)$_2$)$_2$ | CH$_2$Cl$_2$ | 100 | 0.01 | 12 | 99 |
| Zn(N(TMS)$_2$)$_2$ | CH$_2$Cl$_2$ | 100 | 0.1 | 72 | 65 |
| BDIZnN(TMS)$_2$$^e$ | CH$_2$Cl$_2$ | 100 | 0.1 | 72 | 24 |
| Fe(N(TMS)$_2$)$_3$ | CH$_2$Cl$_2$ | 100 | 0.02 | 24 | 87 |
| Cr(N(TMS)$_2$)$_3$ | CH$_2$Cl$_2$ | 100 | 0.02 | 48 | 8 |
| Cp$_2$TiClNMe$_2$ | CH$_2$Cl$_2$ | 25 | 0.02 | 48 | 0 |

$^a$[M]/[I] = [1]/[initiator];
$^b$[M] = initial concentration of 1;
$^c$Total isolated yield of poly(1);
$^d$DepeNiAA = (1,2-bis(diethylphosphino)ethane)Ni(NHCH(CH(CH$_3$)$_2$)—C(O)NC(CH$_3$)$_3$);
$^e$BDI = 2-((2,6-diisopropylphenyl)amino)-4-((2,6-diisopropyl-phenyl)imino)-2-pentene.

Illustrative examples of transition metals useful in the generation of initiators are provided in Tables 1 and 2. Complexes of the metals Ni, Co, Cu, Fe, Sc, and Mg appeared most promising as they gave near quantitative yields of polymer with no detectable imide content or racemization, as is found in the anionic polymerizations.[14,17] While some metal complexes (e.g. those of Mg) were extremely active and gave complete consumption of monomer within minutes, they also gave molecular weights, estimated by viscosity measurements, that were far greater than predicted by monomer to initiator stoichiometry. These results indicated that only a fraction of the total amount of metal complex was active during polymerization. Better results were obtained with Sc(N(TMS)$_2$)$_3$ (2) as polymer chain lengths were much lower, correlating well with the low monomer to initiator ratios, and indicating that a greater portion of the scandium centers were active (FIG. 1).

The key feature that appears to be required for successful initiator formation is the presence of a basic or nucleophilic ligand (e.g. —N(TMS)$_2$) on the metal that is able to react with the beta-lactam monomer. In some cases, (e.g. with Co(PMe$_3$)$_4$) the reactive ligand is generated in situ by reaction of the metal complex with either solvent or monomer. Accordingly, preferred versions of the present invention utilize a transition metal amido complex that includes a nucleophilic ligand such as N(TMS)$_2$, wherein TMS is trimethyl silyl, or an amido amidate (AA) (e.g., (NHCH(CH(CH$_3$)$_2$)C(O)NH$_2$C(CH$_3$)$_3$).

Preferred transition metal complexes utilizing the N(TMS)$_2$ ligand include Sc(N(TMS)$_2$)$_3$, Zn(N(TMS)$_2$)$_2$, Cr(N(TMS)$_2$)$_3$, Co(N(TMS)$_2$)$_2$, Cu(N(TMS)$_2$)$_2$, Mg(N(TMS)$_2$)$_2$, and Fe(N(TMS)$_2$)$_3$, as well as BDIMgN(TMS)$_2$, or BDIZnN(TMS)$_2$, wherein BDI is 2-((2,6-diisopropylphenyl)amido)-4-((2,6-diidopropylphenyl)imino)-2-pentene). Additional transition metal complexes for use in the present invention include DEPENiAA, wherein DEPE is 1,2-bis(dimethylphosphino)ethane and AA is an amido amidate having the formula NHCH(CH(CH$_3$)$_2$)C(O)NH$_2$C(CH$_3$)$_3$; Co(PMe$_3$)$_4$, wherein Me is methyl, and a Ru-amido complex having the formula (para-cymene)Ru(NHCH$_2$CH$_2$NS(O)$_2$C$_6$H$_5$CH$_3$).

β-Lactam monomers suitable for use in the present invention are known, and may include derivatives of aspartic or glutamic acid. Preferably the β-lactam is an aspartic acid derivative having the general formula:

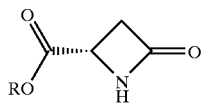

wherein R is an alkyl, aryl, oligo-ethylene glycol monomethyl moiety or side chain protecting group. As described in further detail below, β-lactam derivatives can be synthesized having an oligo-ethylene glycol monomethyl moiety of the general formula —(CH$_2$CH$_2$O)$_n$CH$_3$, wherein n is one to twenty.

The polymerization systems we have developed allow controlled polymerization of beta-lactams that are derived from naturally occurring amino acids. As such, the resulting poly(beta-peptides) should be able to present functionality that is able to interact with biological systems, leading to applications in the biomedical arena. The readily available β-lactam of α-benzyl-L-aspartic acid (1)[20] was chosen as a useful monomer to evaluate different initiators. This monomer, and its corresponding polymer, have been extensively studied by others[14] and allowed us to compare our results to existing polymerization systems.

In order to obtain more quantitative molecular weight data, we synthesized a monomer that would form a poly(β-peptide) with solubility in common solvents better than found for poly(1). Transesterification of 1 with tri- and tetra-ethyleneglycol monomethyl ethers according to the procedure of Muñoz-Guerra[21] gave the ethylene glycol substituted monomers (S)-4-(2-(2-(2-Methoxyethoxy)ethoxy)carbonyl-2-azetidinone (3) and (S)-4-(2-(2-(2(2-Methoxyethoxy)ethoxy)ethoxy)ethoxy)carbonyl-2-azetidinone (4) (eq 2).

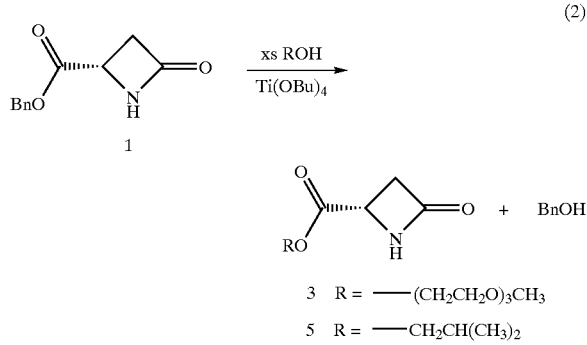

Figure 2:
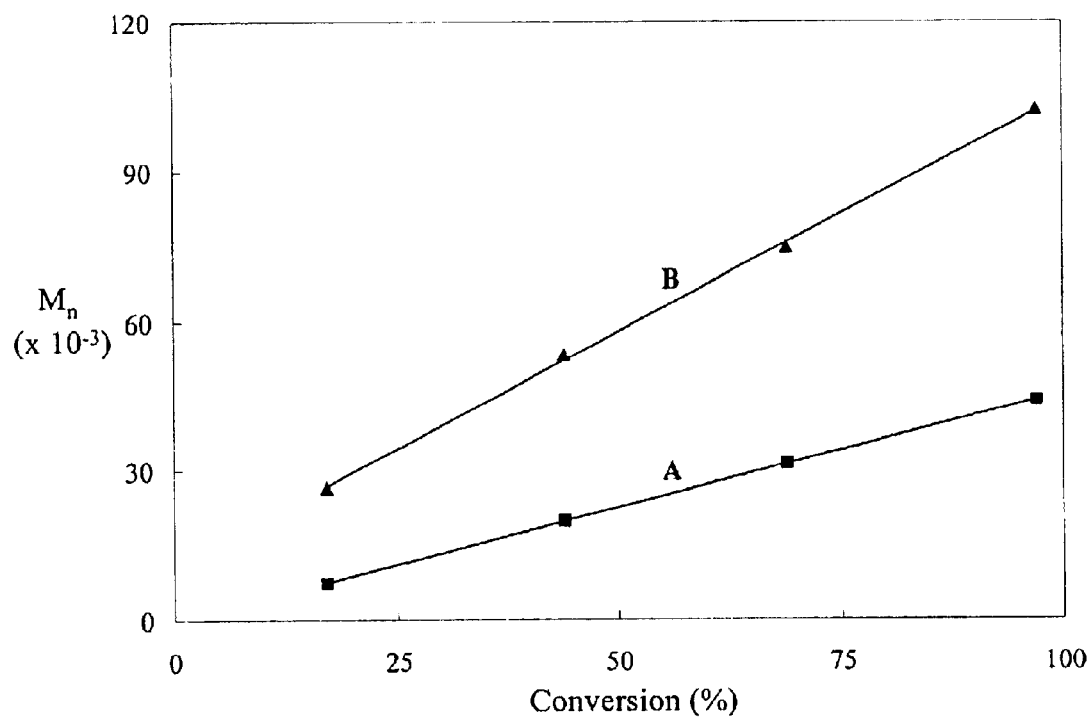
FIG. 2 shows the molecular weight of poly(4) versus monomer conversion. Polymerization was carried out at 20° C. in $CH_2Cl_2$ using $Sc(N(TMS)_2)_3$ initiator 2 with an initial concentration of (S)-4-(2-(2-(2(2-Methoxyethoxy)ethoxy)ethoxy)ethoxy)carbonyl-2-azetidinone [4]=0.02 M and [4]/[2]=150. A=theoretical molecular weight calculated from monomer conversion. B=molecular weight of poly(4) determined by GPC/light scattering in 0.1 M LiBr in DMF at 60° C. (dn/dc=0.105 mL FIG. 3 shows the CD spectrum of poly(4) at 20° C.

The polymer of 4 was found to be highly soluble in many solvents including H$_2$O and DMF such that accurate molecular weight data could be obtained using tandem LS-GPC. (See examples) Polymerization of 4 with the initiator 2 at different monomer to initiator ratios and at different extents of reaction gave the data in Table 3 and FIG. 2. Poly(β-peptide)s were obtained with narrow molecular weight distributions (MWD) and chain lengths could be controlled by both stoichiometry and monomer conversion, characteristic of a living polymerization system.[19] Also supporting this assessment, kinetic analysis of polymerizations showed them to be first order in monomer concentration with no deviation to 4 half-lives, (see examples) indicating no detectable chain termination. Since measured molecular weights were greater than predicted by theory, it is likely that not all of the metal complex is active in initiating chain growth.

Another embodiment of the present invention is the product of the foregoing methods, in particular a poly(β-peptide) having the formula:

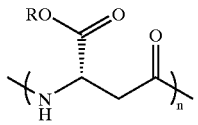

wherein R is an alkyl, aryl, oligo-ethylene glycol monomethyl, or side-chain protecting group and n is about 5 to about 200. Preferably the poly (β-peptide) will a polydispersity index of about 1 to about 1.3 and a molecular weight of about 10,000 to about 250,000.

Metalated Lactam Intermediates

The general characteristics of the metal initiators in these polymerizations are either the presence or formation of a basic/nucleophilic ligand on the metal that is able to interact with the beta-lactam monomer to begin polymerization.

Preliminary mechanistic studies using $^1$H NMR revealed that $HN(TMS)_2$ was liberated upon addition of β-lactam monomers to 2. (See examples) These data suggest that the resulting metalated lactams are the initiating species in the polymerizations. It appears that the increased covalent nature of the metal-nitrogen bonds in these complexes, relative to alkali metal counterparts, serves to substantially eliminate side reactions in these polymerizations.

Accordingly, another embodiment of the present invention is method of making a metalated lactam, which involves combining a beta lactam monomer and a complex comprising a transition metal and a reactive nucleophilic ligand, for a time and under conditions effective liberate a reactive ligand and to form the metalated lactam.

Yet another embodiment of the present invention is a composition containing key components of the reaction mixture, which can include the beta lactam monomer, the transition metal complex, and the metalated lactam intermediate.

Preferred versions of the metalated lactam have the following formula:

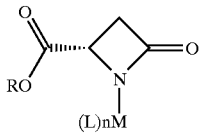

wherein R is an alkyl, aryl, oligo-ethylene glycol monomethyl moiety or side chain protecting group; M is a transition metal, L is a ligand and n is 1, 2 or 3.

Block Copoly(β-Peptides)

With such a well-behaved system, the preparation of block copolymers is now feasible. Accordingly another embodiment of the present invention is a method of making a block copoly (β-peptides), which includes at least two steps. For the first step, a first beta lactam monomer and a transition metal complex are combined for a sufficient time and under conditions effective to polymerize the first beta lactam monomer and to form a first block of the block copoly (β-peptide). For the next step, a second beta lactam monomer, which is different than the first monomer, is added to the reaction mixture to form a second block attached to the first block. Moreover, the second step can be repeated to form tri-block or multisegment block copoly (β-peptides).

Using initiator 2, we were able to prepare the first examples of di- and tri-block copoly(β-peptides) (Table 3). LS-GPC chromatograms of the initial segments and complete block copoly(β-peptides) were all unimodal with narrow MWD, indicating no deactivation of growing chain ends (e.g. by the deprotonation of backbone amide linkages)[17] in between the sequential monomer additions. Copolymer molecular weights were found to increase as expected on growth of each block segment while polydispersities remained low. No homopolymer contaminants could be detected by selective solvent extractions, and NMR measurements confirmed the expected comonomer compositions and lack of chain branching. (See examples) Using 2, we were also able to synthesize a triblock copolymer, poly(4)$_{45}$-b-poly(1)$_{10}$-b-poly(4)$_{45}$, which gave a unimodal GPC peak with $M_n$=58 350 and $M_w/M_n$=1.17 indicating that sequences of greater complexity can be prepared. (See examples)

With the ability to readily transesterify 1, a variety of different side-chain functionalized poly(β-aspartates) can be prepared to modify the properties of the corresponding polymers (Table 3). For example, block copolymerization of 4 with 5 gave surfactant-like hydrophilic-b-hydrophobic materials. Accordingly, a preferred version of the present invention is an amphiphilic block copoly (β-peptide), the first block having one or more hydrophilic side chains and the second block having one or more hydrophobic side chains. For example, the hydrophilic side chains of the first block can be charged or oligo-ethylene glycol functionalized side chains and the hydrophobic side chains of the second block can be alkyl or aryl esters.

TABLE 3

SYNTHESIS OF POLY(β-PEPTIDES) AND BLOCK COPOLY(β-PEPTIDES) USING 2 AT 20° C.

| | First segment | | | Diblock copolymer | | | |
|---|---|---|---|---|---|---|---|
| Solvent | 4[a] | $\overline{M}_n$[b] | $\overline{M}_w/\overline{M}_n$[b] | 2nd monomer[a] | $\overline{M}_n$[c] | $\overline{M}_w/\overline{M}_n$[c] | Yield (%)[d] |
| CH$_2$Cl$_2$ | 10 | 19 820 | 1.19 | — | — | — | 97 |
| CH$_2$Cl$_2$ | 25 | 25 910 | 1.19 | — | — | — | 98 |
| CH$_2$Cl$_2$ | 50 | 49 980 | 1.23 | — | — | — | 96 |
| CH$_2$Cl$_2$ | 75 | 62 870 | 1.07 | — | — | — | 95 |
| CH$_2$Cl$_2$ | 150 | 100 500 | 1.21 | — | — | — | 94 |
| THF | 25 | 49 580 | 1.15 | — | — | — | 99 |
| THF | 75 | 96 470 | 1.07 | — | — | — | 97 |
| DMF | 25 | — | — | — | — | — | 0 |
| DMF | 75 | — | — | — | — | — | 0 |
| CH$_2$Cl$_2$ | 50 | 49 980 | 1.23 | 5 1 | 54 790 | 1.26 | 95 |
| CH$_2$Cl$_2$ | 25 | 32 000 | 1.07 | 50 3 | 70 550 | 1.09 | 94 |
| CH$_2$Cl$_2$ | 20 | 20 010 | 1.20 | 50 4 | 72 590 | 1.09 | 93 |
| CH$_2$012 | 50 | 49 980 | 1.23 | 10 5 | 61 220 | 1.25 | 95 |

[a]First monomer (4) and second monomers added stepwise to the initiator, number indicates equivalents of monomer per 2;
[b]Molecular weight and polydispersity index after polymerization of the first monomer (as determined by tandem GPC/light scattering in 0.1 M LiBr in DMF at 60° C.);
[c]Molecular weight and polydispersity index after polymerization of the second monomer;
[d]Total isolated yields of poly(4) and block copoly(β-peptides).

These copolymers should also display interesting properties arising from their ability to adopt ordered chain conformations in solution. Using CD spectroscopy, Poly(4) was found to adopt a 3$_1$-helix in H$_2$O, (see examples) similar to the conformations found for poly(1) and other short β-peptide sequences.[2] Like β-peptide oligomers, these block copolymers can be thought of as mimics of their α-peptide analogs with the benefit of increased stability against enzymatic degradation. Thus, identification of these initiators for β-lactam polymerizations opens up many new areas of investigation for β-peptide materials.

Thus, yet another embodiment of the present invention is a block copoly (β-peptide) comprising a first block and a second block attached to the first block, the first block having ten or more identical first beta amino acid residues and the second block having ten or more identical second beta amino acid residues. Preferably the block copoly (β-peptide) has a narrow molecular weight range reflected by a polydispersity index of about 1 to about 1.3.

The key of our discovery here is that, for the first time, it has been demonstrated that metal complexes can be used to control the molecular weight of poly beta-peptides and allow the preparation of block copoly-beta-peptides.

EXAMPLES

General.

Tetrahydrofuran, hexane, dichloromethane, dimethylformamide, and diethyl ether were dried by passage through alumina under nitrogen prior to use.[22] Chemicals were purchased from commercial supplies and used without purification. NMR spectra were recorded on a Bruker AVANCE 200 and 500 MHz spectrometer. Tandem gel permeation chromatography/light scattering (GPC/LS) was performed on a SSI Accuflow Series III liquid chromatograph pump equipped with a Wyatt DAWN DSP light scattering detector and Wyatt Optilab DSP. Separations were effected by $10^5$ Å and $10^3$ Å Phenomenex 5 μm columns using 0.1M LiBr in DMF eluent at 60° C. Viscosity measurements of poly(1) were made in dichloroacetic acid (DCA) solution using an Ubbelohde type capillary viscometer at 25±0.1° C. Circular Dichroism measurements were carried out on an Olis Rapid Scanning Monochromator running in conventional scanning mode at room temperature. The path length of the quartz cell was 1.0 mm and the concentration of polypeptide was 0.2–1.0 mg/mL. Optical rotations were measured on a Jasco Model P1020 Polarimeter using a 1 mL volume cell (1 dm length). Infrared spectra were recorded on a Perkin Elmer RX1 FTIR Spectrophotometer calibrated using polystyrene film. Deionized water (18 MΩ-cm) was obtained by passing in-house deionized water through a Barnstead E-pure purification system. (1,2-Bis(diethylphosphino)ethane)-Ni(NHCH(CH(CH$_3$)$_2$)C(O)NC(CH$_3$)$_3$) (DepeNiAA) was prepared as previously described.[23] Zn(N(TMS)$_2$)$_2$ was purchased from Aldrich and used without further purification. 2-((2,6-diisopropylphenyl)amino)-4-((2,6-diisopropylphenyl)imino)-2-pentene (BDI-H),[24] 5,[21] Co(N(TMS)$_2$)$_2$,[25] Sc(N(TMS)$_2$)$_3$ (2),[25,26] Cu(N(TMS)$_2$Fe(N(TMS)$_2$)$_3$,[25,26] Cr(N(TMS)$_2$)$_3$,[25,26] Mg(N(TMS)$_2$)$_2$,[28] BDIZnN(TMS)$_2$,[29] and BDIMgN(TMS)$_2$[30] were synthesized according to the literature procedures.

(S)-4-(Benzyloxycarbonyl)-2-azetidinone (1).

1 was synthesized according to a procedure similar to that reported by Salzmann.[20] A modified procedure[31] was adopted to achieve higher yields of 1. Commercially available L-aspartic acid dibenzyl ester p-toluenesulfonate salt (25 g 0.052 mol) was charged to a dry schlenk flask. The substrate in the flask was dried under high vacuum for 2 h. Dry CH$_2$Cl$_2$ (450 mL) was transferred to the flask under N$_2$ and then the solution was cooled to 0° C. using an ice bath. Triethyl amine (15.8 mL, 0.1133 mol, 2.2 eq) was added and followed by addition of TMSCl (6.588 mL, 0.052 mol). The solution was slowly warmed to room temperature and stirred for an additional 12 h. The solution was then cooled again to 0° C. and tert-BuMgCl (77 mL of a 2.0 M solution in diethyl ether, 3.0 eq) was slowly added to the mixture. The solution was kept at 0° C. for 2 h and then slowly warmed to room temperature. The reaction was stopped 10 h later by addition of 200 mL wet CH$_2$Cl$_2$. The organic phase was washed with 1 N HCl (2×400 mL), saturated NaHCO$_3$ (2×400 mL) and brine (2×400 mL). The organic phase was dried over MgSO$_4$. After the solvent was removed, a yellow solid was obtained. The solid was purified by crystallization from CH$_3$OH and then sublimation at 110° C. under high vacuum to give 1 as white crystals (6.1 g, 55%). FTIR (THF): 1779 cm$^{-1}$ (vCO, lactam, s), 1747 cm$^{-1}$ (vCO, ester, s). $^1$H NMR (CDCl$_3$, 500 MHz) δ 7.25 (s, 5H, CH$_2$C(O)NHCH(CO$_2$CH$_2$C$_6$H$_5$)), 6.0 (br, 1H, CH$_2$C(O)NHCH(CO$_2$CH$_2$C$_6$H$_5$)), 5.15 (s, 2H, CH$_2$C(O)NHCH(CO$_2$CH$_2$C$_6$H$_5$)), 4.24 (dd, 1H, CH$_2$C(O)NHCH(CO$_2$CH$_2$C$_6$H$_5$)), 3.36 (ddd, 1H, CH$_2$C(O)NHCH(CO$_2$CH$_2$C$_6$H$_5$), 3.15 (ddd, 1H, CH$_2$C(O)NHCH(CO$_2$CH$_2$C$_6$H$_5$)). $^{13}$C NMR (CDCl$_3$, 200 MHz) δ 171.0, 166.5, 135.1, 128.9, 128.7, 67.7, 47.5, 43.8. FTIR, $^1$H NMR and 13C NMR spectra of this compound were identical to literature data for 1.[12]

(S)-4-(2-(2-(2-Methoxyethoxy)ethoxy)ethoxy)carbonyl-2-azetidinone (3).

3 was prepared by transesterification of 1 with triethyleneglycol monomethyl ether following the procedure reported by Muñoz-Guerra et al.[21] A vigorously stirred solution of 1 (2.05 g, 10 mmol) and titanium(IV) tetrabutoxide (0.1 g, 0.3 mmol) in dry tri(ethylene glycol) monomethyl ether (20 mL) was heated at 90° C. for 12 h. The course of transesterification was followed by TLC. The reaction was assumed to be complete when no trace of UV absorption indicative of 1 was detectable. The unreacted tri(ethylene glycol) monomethyl ether was distilled off under vacuum and can be reused. The remaining brown residue was purified by passage through a silica gel column (ethyl acetate and hexane, 1:1). The eluent fractions containing product were combined and the solvent was evaporated under vacuum to afford a light yellow oil. Pure compound 3 was obtained by vacuum distillation of this oil (1.21 g, 46%). FTIR (THF): 1779 cm$^{-1}$ (vCO, lactam, s), 1745 cm$^{-1}$ (vCO, ester, s). $^1$H NMR (CDCl$_3$, 500 MHz) δ 6.73 (br, 1H, CH—$_2$C(O)NHCH(CO$_2$CH$_2$CH$_2$OCH$_2$CH$_2$OCH$_2$CH$_2$OCH$_3$)), 4.36 (m, 2H, CH—$_2$C(O)NHCH(CO$_2$CH$_2$CH$_2$OCH$_2$CH$_2$OCH$_2$CH$_2$OCH$_3$)), 4.19 (dd, 1H, CH—$_2$C(O)NHCH(CO$_2$CH$_2$CH$_2$OCH$_2$CH$_2$OCH$_2$CH$_2$OCH$_3$)), 3.71 (m, 2H, CH—$_2$C(O)NHCH(CO$_2$CH$_2$CH$_2$OCH$_2$CH$_2$OCH$_2$CH$_2$OCH$_3$)), 3.63 (m, 6H, CH—$_2$C(O)NHCH(CO$_2$CH$_2$CH$_2$OCH$_2$CH$_2$OCH$_2$CH$_2$OCH$_3$)), 3.54 (m, 2H, CH—$_2$C(O)NHCH(CO$_2$CH$_2$CH$_2$OCH$_2$CH$_2$OCH$_2$CH$_2$OCH$_3$)), 3.37 (s, 3H, CH—$_2$C(O)NHCH(CO$_2$CH$_2$CH$_2$OCH$_2$CH$_2$OCH$_2$CH$_2$OCH$_3$)), 3.26 (ddd, 1H, CH—$_2$C(O)NHCH(CO$_2$CH$_2$CH$_2$OCH$_2$CH$_2$OCH$_2$CH$_2$OCH$_3$)), 3.08 (ddd, 1H, CH—$_2$C(O)NHCH(CO$_2$CH$_2$CH$_2$OCH$_2$CH$_2$OCH$_2$CH$_2$OCH$_3$)). $^{13}$C NMR (CDCl$_3$, 200 MHz) δ 171.4, 166.4, 72.2, 71.0, 70.9, 70.8, 69.1, 64.9, 59.3, 47.6, 43.9. [α]$^{25}$D: −15.1 (C 0.52 in THF) MS calcd: 261.28; found: 262.33 (MH$^+$).

(S)-4-(2-(2-(2-(2-Methoxyethoxy)ethoxy)ethoxy)ethoxy)carbonyl-2-azetidinone (4).

4 was prepared by transesterification of 1 with tetraethyleneglycol monomethyl ether following a procedure similar to the synthesis of 3. A vigorously stirred solution of 1 (2.05 g, 10 mmol) and titanium (IV) tetrabutoxide (0.1 g, 0.3 mmol) in dry tetra(ethylene glycol) monomethyl ether (25 mL) was heated at 85° C. for 8–10 h. The course of transesterification was followed by TLC. The reaction was assumed to be complete when no trace of UV absorption indicative of 1 was detectable. The unreacted tetra(ethylene glycol) monomethyl ether was distilled off under vacuum and can be reused. The light brown residue was then passed through a silica gel column (MeOH/ethyl acetate, 1:20). The eluent fractions containing product were combined and the solvent was evaporated under vacuum to afford the product as a colorless oil. (1.21 g, 42%). FTIR (THF): 1779 cm$^{-1}$ (vCO, lactam, s), 1745 cm$^{-1}$ (vCO, ester, s). $^1$H NMR (CDCl$_3$, 500 MHz) δ 6.63 (br, 1H, CH—$_2$C(O)N H̲CH(CO$_2$CH$_2$CH$_2$OCH$_2$CH$_2$OCH$_2$CH$_2$OCH$_2$CH$_2$OCH$_3$)), 4.34 (m, 2H CH$_2$C(O)NHCH(CO$_2$CH̲$_2$CH$_2$OCH$_2$CH$_2$-OCH$_2$CH$_2$OCH$_2$CH$_2$OCH$_3$)), 4.19 (dd, 1H CH$_2$C(O)NHC H̲(CO$_2$CH$_2$CH$_2$OCH$_2$CH$_2$OCH$_2$CH$_2$OCH$_2$CH$_2$OCH$_3$)), 3.71–3.63 (m, 12H CH$_2$C(O)NHCH(CO$_2$CH$_2$CH̲$_2$OCH$_2$C H̲$_2$OCH$_2$CH̲$_2$OCH̲$_2$CH$_2$OCH$_3$)), 3.55 (m, 2H, CH$_2$C(O) NHCH(CO$_2$CH$_2$CH$_2$OCH$_2$CH$_2$OCH$_2$CH$_2$OCH$_2$C H̲$_2$OCH$_3$)), 3.35 (s, 3H, CH$_2$C(O)NHCH(CO$_2$CH$_2$-CH$_2$OCH$_2$CH$_2$OCH$_2$CH$_2$OCH$_2$CH$_2$OCH̲$_3$)), 3.25 (ddd, 1H, CH̲$_2$C(O)NHCH(CO$_2$CH$_2$CH$_2$OCH$_2$CH$_2$OCH$_2$CH$_2$OCH$_2$-CH$_2$OCH$_3$)), 3.09 (ddd, 1H, CH̲$_2$C(O)NHCH(CO$_2$CH$_2$-CH$_2$OCH$_2$CH$_2$OCH$_2$CH$_2$OCH$_2$CH$_2$OCH$_3$)). $^{13}$C NMR (CDCl$_3$, 200 MHz) δ 171.5, 166.3, 72.9, 71.0, 70.9, 69.1, 65.0, 59.4, 47.6, 43.9. [α]$^{25}_D$: −10.9 (C=0.26 in THF). MS calcd: 305.33; found: 328.43 (MNa$^+$).

Example Polymerization of 1 with Co(PMe$_3$)$_4$.

In the dry box, monomer 1 (205 mg, 1 mmol) was dissolved in CH$_2$Cl$_2$ (5 mL) and placed in a 25 mL reaction tube which could be sealed with a Teflon stopcock. An aliquot of Co(PMe$_3$)$_4$ (40 μL of a 0.05 M solution in THF) was then added via syringe to the flask. A stirbar was added and the flask was sealed, removed from the dry box, and stirred at room temperature for 24 h. Polymer was isolated by addition of the reaction mixture to methanol causing precipitation of the polymer. The polymer was then washed with methanol several times. The polymer was dried in vacuo to give poly(α-benzyl-L-aspartate), poly(1), as a fibrous solid (205 mg, 100% yield). FT-IR (CHCl$_3$): 1745 cm$^{-1}$ (vCO, ester, s), 1652 cm$^{-1}$ (vCO, amide I, br vs), 1552 cm$^{-1}$ (vCO, amide II, br s). No infrared absorptions characteristic of poly(imide) formation (ca. 1710 cm$^{-1}$) were observed. $^1$H NMR (TFA-d): δ 7.61 (s, 5H, —(NHCH$_2$CH (CO$_2$CH$_2$C$_6$H$_5$)C(O))—), 5.60 (d, 1H, —(NHCH$_2$CH (CO$_2$CH̲$_2$C6H$_5$)C(O))—, J=11.8 Hz), 5.43(d, 1H, —(NHC H̲$_2$CH(CO$_2$CH$_2$C$_6$H$_5$)C(O))—, J=11.8 Hz)), 5.17 (br, 1H, —(NHCH$_2$CH̲(CO$_2$CH$_2$C$_6$H$_5$)C(O))—), 3.46 (d, 1H, —(NHCH$_2$CH(CO$_2$CH$_2$C$_6$H$_5$)C(O))—, J=12.7 Hz), 3.17 (d, 1H, —(NHCH̲$_2$CH(CO$_2$CH$_2$C$_6$H$_5$)C(O))—, J=12.7 Hz). $^{13}$C (TFA-d): 175.0, 174.7, 136.3, 131.4, 131.0, 130.8, 72.0, 52.0, 38.6. DEPT 135 (TFA-d): 131.4 up, 131.0 up, 130.8 up, 72.0 down, 52.0 up, 38.6 down.

Polymerization of 1 Using 2.

In the dry box, compound 1 (41 mg, 0.2 mmol) was dissolved in CH$_2$Cl$_2$ (10 mL) and placed in a 25 mL reaction tube which could be sealed with a Teflon stopcock. An aliquot of 2 (40 μL of a 0.05 M solution in THF) was then added via syringe to the flask. A stirbar was added and the flask was sealed, removed from the dry box, and stirred at room temperature for 24 h. Polymer was isolated by addition of the reaction mixture to methanol causing precipitation of the polymer. The polymer was then washed with methanol for several times and dried under vacuum to give poly(1) as a fibrous solid (40 mg, 98%). FTIR (CHCl$_3$): 1745 cm$^{-1}$ (vCO, ester, s), 1652 cm$^{-1}$ (vCO, amide I, br vs), 1552 cm$^{-1}$ (vCO, amide II, br s). $^1$H NMR (500 MHz, TFA-d): δ 7.61 (s, 5H, —(NHCH(CO$_2$CH$_2$C$_6$H̲$_5$)CH$_2$C(O))—), 5.60 (d, 1H, —(NHCH(CO$_2$CH̲$_2$C$_6$H$_5$)CH$_2$C(O))—, J=11.8 Hz), 5.43 (d, 1H, —(NHCH(CO$_2$CH̲$_2$C$_6$H$_5$)CH$_2$C(O))—, J=11.8 Hz)), 5.17 (br, 1H, —(NHCH̲(CO$_2$CH$_2$C$_6$H$_5$)CH$_2$C(O))—), 3.46 (d, 1H, —(NHCH(CO$_2$CH$_2$C$_6$H$_5$)CH̲$_2$C(O))—, J=12.7 Hz), 3.17 (d, 1H, —(NHCH(CO$_2$CH$_2$C$_6$H$_5$)CH̲$_2$C(O))—, J=12.7 Hz). $^{13}$C NMR (500 MHz, TFA-d): δ 175.0, 174.7, 136.3, 131.4, 131.0, 130.8, 72.0, 52.0, 38.6. DEPT 135 NMR (500 MHz, TFA-d): 131.4 (+), 131.0 (+), 130.8 (+), 72.0 (−), 52.0 (+), 38.6 (−). [α]$^{25}_D$: +5.5 (C=0.31 in TFA).

Example Polymerization of 3 with Co(PMe$_3$)$_4$.

In the dry box, 3 (261 mg, 1 mmol) was dissolved in CH$_2$Cl$_2$ (5 mL) and placed in a 25 mL reaction tube which could be sealed with a Teflon stopcock. An aliquot of Co(PMe$_3$)$_4$ (40 μL of a 0.05 M solution in THF) was then added via syringe to the flask. A stirbar was added and the flask was sealed, removed from the dry box, and stirred at room temperature for 24 h. Polymer was isolated by addition of the reaction mixture to ethyl ether causing precipitation of the polymer. The polymer was then dissolved in methanol and reprecipitated by addition to ethyl ether. Further purification of polymer was achieved by dialysis in water followed by freeze-drying. The polymer, poly(α-(2-(2-(2-methoxyethoxy)ethoxy)ethyl)-L-aspartate), poly(3), was obtained as a fibrous solid (258 mg, 98% yield). FT-IR (THF): 1745 cm$^{-1}$(vCO, ester, s), 1652 cm$^{-1}$ (vCO, amide I, br vs),1552 cm$^{-1}$ (vCO, amide II, br s). No infrared absorptions characteristic of poly(imide) formation (ca. 1710 cm$^{-1}$) were observed. $^1$H NMR (TFA-d, 500 MHz) 5.37 (br, 1H, —C(O)NHCH$_2$CH̲(CO$_2$CH$_2$CH$_2$OCH$_2$-CH$_2$OCH$_2$CH$_2$OCH$_3$)—), 4.87 (br, 1H, —C(O)NHCH$_2$CH (CO$_2$CH̲$_2$CH$_2$OCH$_2$CH$_2$OCH,CH$_2$OCH$_3$)—), 4.72 (br, 1H, —C(O)NHCH$_2$CH(CO$_2$CH̲$_2$CH$_2$OCH$_2$CH$_2$OCH$_2$CH$_2$O-CH$_3$)—), 4.23 (br, 10H, —C(O)NHCH$_2$CH(CO$_2$CH$_2$C H̲$_2$OCH̲$_2$CH$_2$OCH̲$_2$CH̲$_2$OCH̲$_2$CH$_2$OCH$_3$)—), 3.89 (br, 3H, —C(O)NHCH$_2$CH(CO$_2$CH$_2$CH$_2$OCH$_2$CH$_2$OCH$_2$CH$_2$OC H̲$_3$)—), 3.58 (br, 1H, —C(O)NHCH̲$_2$CH(CO$_2$CH$_2$CH$_2$-OCH$_2$CH$_2$OCH$_2$CH$_2$OCH$_3$)—), 3.44 (br, 1H, —C(O)NHC H̲$_2$CH(CO$_2$CH$_2$CH$_2$OCH,CH$_2$OCH$_2$CH$_2$OCH$_3$)—). $^{13}$C NMR (CDCl$_3$, 200 MHz) 175.2, 174.7, 75.2, 74.0, 73.6, 72.9, 69.6, 61.9, 58.6, 54.1, 40.9. GPC of the polymer in 0.1 M LiBr in DMF at 60° C.: M$_n$=70,600; M$_w$/M$_n$, =1.09.

Polymerization of 4 using 2.

In the dry box, 4 (61 mg, 0.2 mmol) was dissolved in CH$_2$Cl$_2$ (10 mL) and placed in a 25 mL reaction tube which could be sealed with a Teflon stopcock. An aliquot of 2 (80 μL of a 0.05 M solution in THF) was then added via syringe to the flask. A stirbar was added and the flask was sealed, removed from the dry box, and stirred at room temperature for 24 h. Polymer was isolated by addition of the reaction mixture to ethyl ether causing precipitation of the polymer. The polymer was then dissolved in methanol and reprecipitated by addition to ethyl ether. Further purification of polymer was achieved by dialysis in water. The polymer was freeze dried to give poly(4) as a fibrous solid (59 mg, 96%). FTIR (THF): 1745 cm$^{-1}$(vCO, ester, s), 1652 cm$^{-1}$ (vCO, amide I, br vs), 1552 cm$^{-1}$ (vCO, amide II, br s). $^1$H NMR (TFA-d, 500 MHz) δ 5.07 (br, 1H, —NHCH̲(CO$_2$-CH$_2$CH$_2$OCH$_2$CH$_2$OCH$_2$CH$_2$OCH$_2$CH$_2$OCH$_3$)CH$_2$C (O)—), 4.60 (br, 1H, —NHCH(CO$_2$CH̲$_2$CH$_2$OCH$_2$CH$_2$-OCH$_2$CH$_2$OCH$_2$CH$_2$OCH$_3$)CH$_2$C(O)—), 4.45 (br, 1H, —NHCH(CO$_2$CH̲$_2$CH$_2$OCH$_2$CH$_2$OCH$_2$CH$_2$OCH$_2$CH$_2$O-CH$_3$)CH$_2$C- (O)—), 3.94 (br, 14H, —NHCH(CO$_2$CH$_2$C H̲$_2$OCH̲$_2$CH̲$_2$OCH̲$_2$CH$_2$OCH̲$_2$CH̲$_2$OCH$_3$)CH$_2$C(O)—), 3.61 (br, 3H, —NHCH(CO$_2$CH$_2$CH$_2$OCH$_2$CH$_2$OCH$_2$-CH$_2$OCH$_2$CH$_2$OCH̲$_3$)CH$_2$C(O)—), 3.33 (br dd, 1H, —NH-CH(CO$_2$CH$_2$CH$_2$OCH$_2$CH$_2$OCH$_2$CH$_2$OCH$_2$CH$_2$OCH$_3$)C H̲$_2$C(O)—), 3.15 (br dd, 1H, —NHCH(CO$_2$CH$_2$CH$_2$-OCH$_2$CH$_2$OCH$_2$CH$_2$OCH$_2$CH$_2$OCH$_3$)CH̲$_2$C(O)—). $^{13}$C NMR (TFA-d, 200 MHz) δ 175.0, 174.6, 112.1, 76.5, 73.3, 72.1, 71.7, 71.0, 67.7, 60.0, 58.6, 54.1, 40.9. GPC of the polymer in 0.1 M LiBr in DMF at 60° C. (dn/dc=0.105 mL/g): $M_n$=49 980; $M_w/M_n$=1.23. $[\alpha]^{25}_D$: +41.7 (C=0.07 in TFA).

Figure 3:
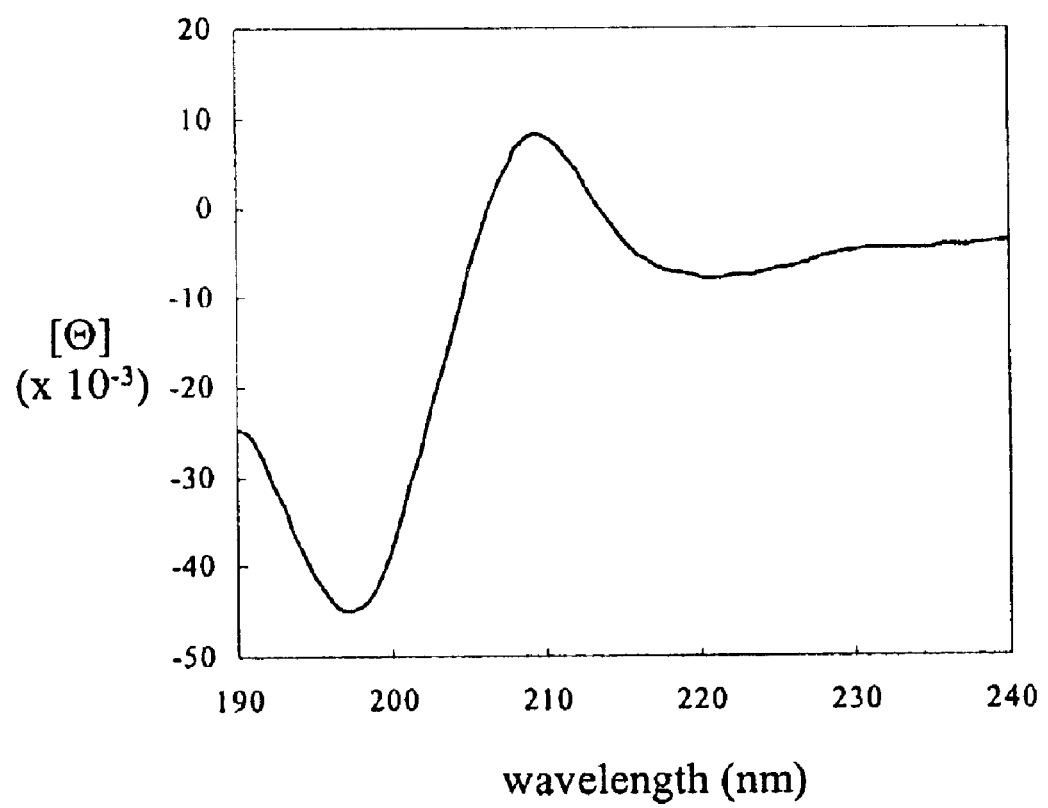

The chain conformation of poly(4) was analyzed in water using CD. The CD spectrum of poly(4) at 20° C. showed a maximum at 209 nm and a minimum at 198 nm with molar ellipticities of $8.3\times10^3$ and $-44.8\times10^3$ deg cm$^2$ mol$^{-1}$, respectively (FIG. 3). The spectral features of this D-configuration polymer are the near-mirror image of those described by Seebach for the heptamer of L-configuration β-homolysine, which was reported to adopt a $3_1$ helical conformation.[32]

Example Block Copolymerization of 3 and 1 with Co(PMe$_3$)$_4$.

In the dry box, 3 (261 mg, 1 mmol) was dissolved in CH$_2$Cl$_2$ (5 mL) and placed in a 25 mL reaction tube which could be sealed with a Teflon stopcock. An aliquot of Co(PMe$_3$)$_4$ (40 μL of a 0.05 M solution in THF) was then added via syringe to the flask. A stirbar was added and the flask was sealed. After stirring in dry box for 12 hours, a CH$_2$Cl$_2$ (5 mL) solution of 1 (205 mg, 1 mmol) was added into the reaction tube which was then stirred at room temperature for an additional 24 h. Polymer was isolated by addition of the reaction mixture to ethyl ether causing precipitation of the polymer. The polymer was then washed with methanol several times and then dried in vacuo to give the block copolymer, poly(3)-poly(1), as a fibrous solid (458 mg, 98% yield). FT-IR (CHCl$_3$): 1745 cm$^1$ (vCO, ester, s), 1652 cm$^{-1}$ (vCO, amide I, br vs, 1552 cm$^{-1}$ (vCO, amide II, br s). No infrared absorptions characteristic of poly(imide) formation (ca. 1710 cm$^{-1}$) were observed.

Block Copolymerization of 4 and 1 using 2.

In the dry box, 4 (61 mg, 0.2 mmol) was dissolved in CH$_2$Cl$_2$ (10 mL) and placed in a 25 mL reaction tube which could be sealed with a Teflon stopcock. An aliquot of 2 (80 μL of a 0.05 M solution in THF) was then added via syringe to the flask. A stirbar was added and the flask was sealed. After stirring in dry box for 12 h, a CH$_2$Cl$_2$ (0.5 mL) solution of 1 (4.1 mg, 0.02 mmol) was added into the reaction tube, and the contents were stirred at room temperature for an additional 12 h. The block copolymer was isolated by addition of the reaction mixture to ethyl ether causing precipitation of the polymer. The polymer was then dialyzed in water for two days and then freeze dried to give the copolymer as a fibrous solid (62 mg, 95%). FT-IR (CHCl$_3$): 1745 cm$^{-1}$(vCO, ester, s), 1652 cm$^{-1}$ (vCO, amide I, br vs), 1552 cm$^{-1}$ (vCO, amide II, br s). $^1$H NMR (TFA-d) δ 7.35 (br s, —(NHCH(CO$_2$CH$_2$C$_6$H$_5$)CH$_2$C(O))$_n$—(NHCH(CO$_2$-CH$_2$CH$_2$OCH$_2$CH$_2$OCH$_2$CH$_2$OCH$_2$CH$_2$OCH$_3$)-CH$_2$C-(O))$_m$—), 5.30 (dd, —(NHCH(CO$_2$CH$_2$C$_6$H$_5$)CH$_2$C(O))$_n$—(NHCH(CO$_2$CH$_2$CH$_2$O—CH$_2$CH$_2$OCH$_2$CH$_2$OCH$_2$CH$_2$-OCH$_3$)CH$_2$C(O))$_m$—), 5.07 (br m, —(NHCH(Co$_2$CH$_2$C$_6$H$_5$)CH$_2$C(O))$_n$—(NHCH(CO$_2$CH$_2$CH$_2$OCH$_2$-CH$_2$OCH$_2$CH$_2$OCH$_2$CH$_2$OCH$_3$)—CH$_2$C(O))$_m$—), 4.90 (br m, —(NHCH(CO$_2$CH$_2$C$_6$H$_5$)CH$_2$C(O))$_n$—(NHCH- (CO$_2$-CH$_2$CH$_2$O—CH$_2$CH$_2$OCH$_2$CH$_2$OCH$_2$CH$_2$OCH$_3$)CH$_2$C(O))$_m$—), 4.62 (br d, —(NHCH(CO$_2$CH$_2$C$_6$H$_5$)CH$_2$C(O))$_n$—(NHCH(CO$_2$CH$_2$CH$_2$OCH$_2$CH$_2$OCH$_2$CH$_2$OCH$_2$-CH$_2$OCH$_3$)—CH$_2$C(O))$_m$—), 4.45 (br d, —(NHCH(Co$_2$CH$_2$C$_6$H$_5$)CH$_2$C(O))$_n$—(NHCH(Co$_2$CH$_2$CH$_2$O—CH$_2$CH$_2$OCH$_2$CH$_2$OCH$_2$CH$_2$OCH$_3$)—CH$_2$C(O))$_m$—), 3.98 (m, —(NHCH(CO $_2$CH$_2$C$_6$H$_5$)CH—$_2$C(O))$_n$—(NHCH(CO$_2$CH$_2$CH$_2$OCH$_2$CH$_2$OCH$_2$CH$_2$OCH$_2$CH$_2$OCH$_3$)CH$_2$-C(O))$_m$—), 3.64 (s, —(NHCH(CO$_2$CH$_2$C$_6$H$_5$)CH$_2$C(O))$_n$—(NHCH(CO$_2$CH$_2$CH$_2$OCH$_2$CH$_2$OCH$_2$CH$_2$OCH$_2$CH$_2$OC H$_3$)—CH$_2$C(O))$_m$—), 3.33 (d, —(NHCH(CO$_2$CH$_2$C$_6$H$_5$) CH$_2$C(O))$_n$—(NHCH(CO$_2$CH$_2$CH$_2$O—CH$_2$CH$_2$OCH$_2$-CH$_2$OCH$_2$CH$_2$OCH$_3$)CH$_2$C(O))$_m$—), 3.21 (d, —(NHCH(CO$_2$CH$_2$C$_6$H$_5$)CH$_2$C(O))$_n$—(NHCH(CO$_2$CH$_2$CH$_2$OCH$_2$-CH$_2$OCH$_2$CH$_2$OCH$_2$CH$_2$OCH$_3$)CH$_2$C(O))$_m$—), 3.14 (d, —(NHCH(CO$_2$CH$_2$C$_6$H$_5$)CH$_2$C(O))$_n$—(NHCH(CO$_2$CH$_2$-CH$_2$OCH$_2$CH$_2$OCH$_2$CH$_2$OCH$_2$CH$_2$OCH$_3$)—CH$_2$C-(O))$_m$—), 2.90 (d, —(NHCH(CO$_2$CH$_2$C$_6$H$_5$)CH$_2$C(O))$_n$—(NHCH(CO$_2$CH$_2$CH$_2$O—CH$_2$CH$_2$OCH$_2$CH$_2$OCH$_2$CH$_2$O-CH$_3$)CH$_2$C(O))$_m$—). GPC of the polymer in 0.1 M LiBr in DMF at 60° C.: $M_n$=54790; $M_w/M_n$=1.26.

Viscosity Measurements.

Polymer solution viscosities were measured by comparing the time (t) required for a specific volume of polymer solution to flow through a capillary tube compared to the time ($t_o$) for pure solvent. Specific viscosity ($\eta_{sp}$) and intrinsic viscosity ($[\eta]$) are given by $\eta_{sp}=(t-t_o)/t_o$ and $[\eta]=[(\ln(t/t_o)/C]_{c=0}$. $[\eta]$ was obtained by plotting $\eta_{sp}/C$ against C (C=concentration of polymer solution in g/dL) according to the equation: $\eta_{sp}/C=[\eta]+k'C$.[33]

Poly(1) (21.4 mg) was dissolved in DCA to give 13 mL of solution. The solution was then maintained in an Ubbelohde type capillary viscometer for 30 minutes at 25±0.1° C. using a water bath. The time (t) was then measured three times at this temperature and the average of the data was calculated. The intrinsic viscosities of poly(1) prepared using 2 at different [M]/[I] ratios is plotted in FIG. 4.

Figure 4:
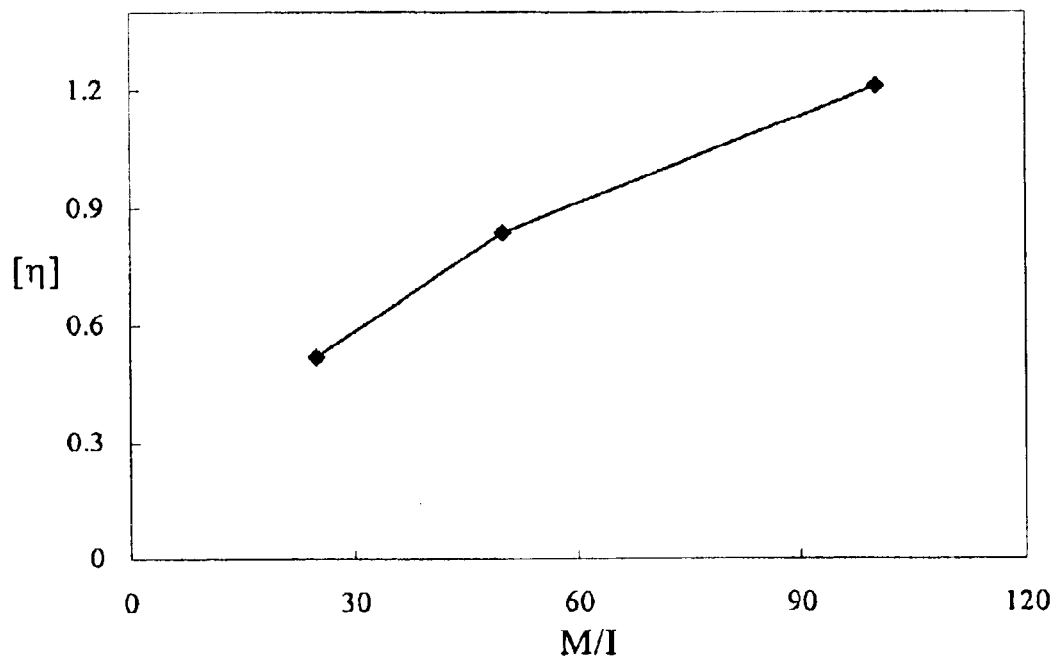
FIG. 4 shows the intrinsic viscosities ([η]) of poly(1) prepared using 2 at different [M]/[I] ratios.

According to the Mark-Houwink-Sakurada equation, $[\eta]=KM_v^a$, $[\eta]$ is proportional to polymer molecular weight. FIG. 4 shows that the molecular weight of poly(1) increased with the monomer to initiator ratio.

Specific Viscosity of poly(1) at Different Monomer Conversions.

Figure 5:
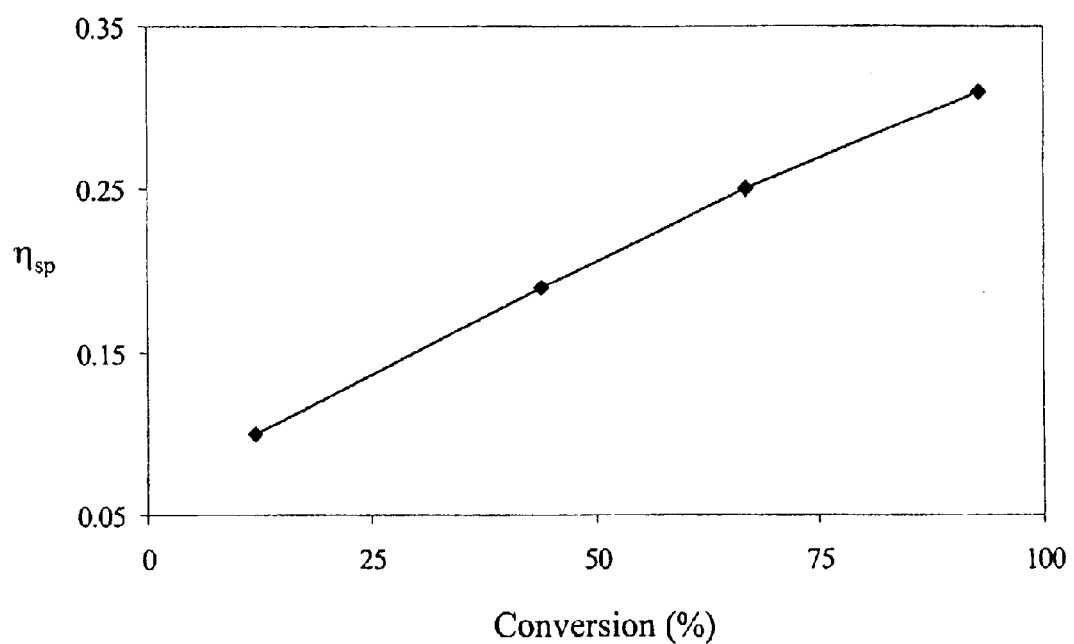
FIG. 5 shows the specific viscosity ($\eta_{sp}$) of poly(1) at different monomer conversions.

In the dry box, 1 (1.03 g, 5 mmol) was dissolved in 200 mL CH$_2$Cl$_2$. A solution of 2 (0.67 mL 0.05 M in THF) was added. The mixture was stirred for 2 min and then separated into four flasks (50 mL aliquots each). Polymerization was terminated at different time intervals by adding methanol to the individual polymerization flasks. The resulting polymers were washed with methanol and dried in vacuo. Conversion of monomer was calculated based on the yield of poly(1). $\eta_{sp}$ values for poly(1) were measured as described above. The plot of $\eta_{sp}$ vs monomer conversion is shown in FIG. 5, and shows an increase in polymer chain length as the reaction proceeds, indicative of the lack of substantial chain transfer reactions.

Molecular Weight Analysis of poly(4) Prepared Using 2 as a Function of Monomer Conversion.

In the dry box, 4 (305 mg, 1 mmol) was dissolved in CH$_2$Cl$_2$ (30.5 mL). A solution of 2 in THF (134 μL, 0.05 M) was added the mixture. The mixture was stirred for 2 min and then separated into four flasks (7.6 mL aliquots each). At different time intervals, monomer conversions were determined by measuring the intensity of the lactam IR stretch at 1779 cm$^{-1}$ for residual monomer in the polymerization solution. Polymerizations were terminated immediately after IR analysis by precipitating the polymers into wet diethyl ether. The resulting polymers were washed with ether and dried in vacuo. Molecular weights of the Poly(4) samples were then analyzed by GPC in 0.1 M LiBr in DMF at 60° C.

Kinetic Analysis of Polymerization of 4 Using 2.

Figure 6:
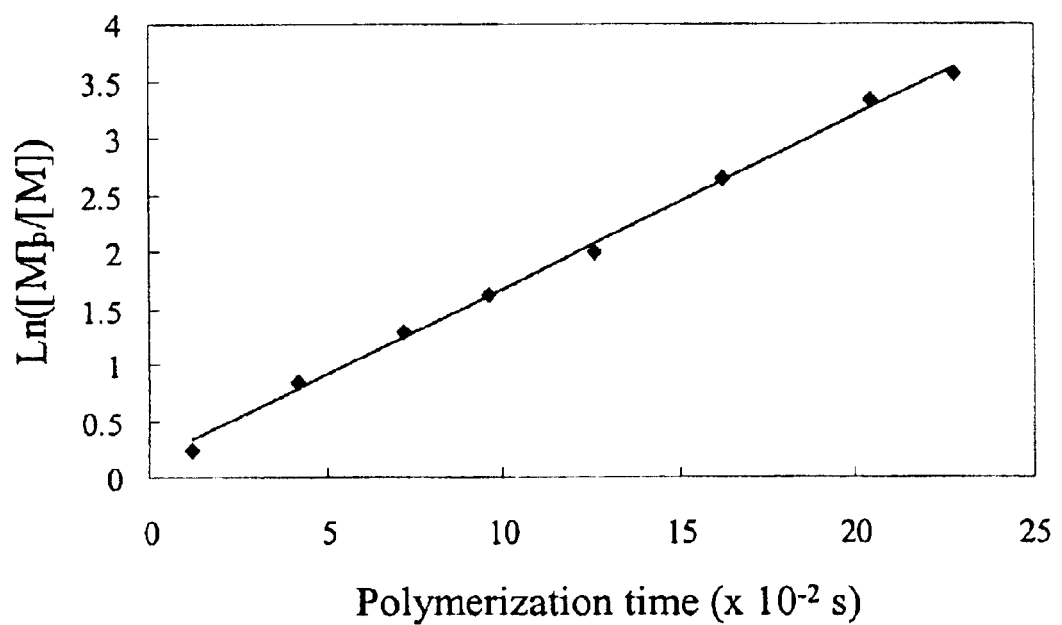
FIG. 6 shows the kinetic analysis of a beta-lactam polymerization reaction by plotting the log of the lactam concentration versus polymerization time.

4 (100 mg, 0.325 mmol) was dissolved in CH$_2$Cl$_2$ (10.0 mL). A solution of 2 in THF (43 μL, 0.05M) was added to this mixture in the dry box ([4]/[2]=150). The resulting solution was stirred for 2 min, and then divided into 10 equal portions (1.0 mL) and each injected into an ampule. The ampules were sealed with grease and then placed in a thermostated bath (25° C.). The intensity of the lactam infrared stretching absorption at 1779 cm$^{-1}$ was measured at various time intervals by injecting an aliquot of polymerization solution into a Wilmad 0.1 mm NaCl cell. The polymerization rate constant ($k_{obs}$=1.53×10$^{-3}$ s$^{-1}$) was obtained by plotting the log of the lactam concentration versus polymerization time and fitting the data using standard rate expressions (FIG. 6).

NMR Analysis of Polymerization Initiation of 1 Using 2.

In the dry box, 1 (4.5 mg, 0.02 mmol) was dissolved in 1 mL dry CDCl$_3$, and to this a solution of 2 (24 mg in 0.5 mL dry CDCl$_3$, 2 eq) was added. The solution was stirred for 1 min and transferred to a 5 mm NMR tube, which was sealed with a septum. A $^1$H NMR spectrum was acquired for this sample at 25° C. The CHCl$_3$ resonance (chemical shift δ 7.27) was used as the internal reference. Two high field peaks were observed: δ 0.28 (Sc(N(Si(C$\underline{H}$$_3$)$_3$)$_2$)$_3$), 0.08 (NH(Si(C$\underline{H}$$_3$)$_3$)$_2$); Intensity ratio: 3:1. The resonances were assigned by addition of authentic samples to the reaction mixture.

The references of the following bibliography are all incorporated herein by reference in their entirety.

References 1. (a) Appella, D. H.; Christianson, L. A.; Karle, I. L.; Powell, D. R.; Gellman, S. H. *J. Am. Chem. Soc.* 1996, 118, 13071–13072. (b) Appella, D. H.; Christianson, L. A.; Klein, D. A.; Powell, D. R.; Huang, X.; Barchi, J. J.; Gellman, S. H. *Nature* 1997, 387, 381. (c) Krauthäuser, S.; Christianson, L. A.; Powell, D. R.; Gellman, S. H. *J. Am. Chem. Soc.* 1997, 119, 11719–11720. (d) Chung, Y. J.; Christianson, L. A.; Stanger, H. E.; Powell, D. R.; Gellman, S. H. *J. Am. Chem. Soc.* 1998, 120, 10555–10556. (e) Gellman, S. H. *Acc. Chem. Res.* 1998, 31, 173–180. (f) Appella, D. H.; Barchi Jr; J. J.; Durell, S. R.; Gellman, S. H. *J. Am. Chem. Soc.* 1999, 121, 2309–2310. (g) Appella, D. H.; Christianson, L. A.; Karle, I. L.; Powell, D. R.; Gellman, S. H. *J. Am. Chem. Soc.* 1999, 121, 6206–6212 (h) Porter, E. A.; Wang, X.; Lee, H.; Weisblum, B.; Gellman, S. H. *Nature*, 2000, 404, 565.
2. (a) Seebach, D.; Overhand, M.; Kühnle, F. N. M.; Martinoni, B.; Oberer, L.; Hommel, U.; Widmer, H. *Helv. Chim. Acta*. 1996, 79, 913–941. (b) Seebach, D.; Ciceri, P. E.; Overhand, M.; Jaun, B; Rigo, D; Oberer, L.; Hommel, U.; Amstutz, R.; Widmer, H. *Helv. Chim. Acta*. 1996, 79, 2043–2067. (c) Seebach, D.; Matthews, J. L. *J. Chem. Soc. Chem. Commun*. 1997, 2015–2022. (d) Abele, S.; Guichard, G.; Seebach, D. *Helv. Chim. Acta*. 1998, 81, 2141–2156. (e) Seebach, D.; Abele, S.; Sifferlen, T.; Hänggi, M.; Gruner, S.; Seiler, P. *Helv. Chim. Acta*. 1998, 81, 2218–2243. (f) Gademann, K.; Ernst, M.; Hoyer, D.; Seebach, D. *Angew. Chem. Int. Ed*. 1999, 38, 1223–1226.
3. Gung, B. W.; Zou, D.; Stalcup, A. M.; Cottrell, C. E. *J. Org. Chem*. 1999, 64, 2176–2177.
4. Hamuro, Y.; Schneider, J. P.; DeGrado, W. F. *J. Am. Chem. Soc*., 1999, 121, 12200–12201.
5. (a) Cheng, J.; Ziller, J. W.; Deming, T. *J. Org. Lett*. 1999, 2, 1943–1946. (b) Cheng, J; Deming, T. J. Submitted to *Macromolecules*.
6. Kovacs, J.; Ballina. R.; Rodin, R.; Balasubramanian, D.; Applequist, J.; *J. Am. Chem. Soc*., 1965, 87, 119–120.
7. Hardy, P. M.; Haylock, J.; Rydon, H.; *J Chem. Soc., Perkin Trans.* I, 1972, 605.
8. Yuki, H.; Okamoto, Y.; Taketani, Y.; Tsubota, T.; Marubayashi, Y.; *J. Polym. Sci., Polym. Chem. Ed*. 1978, 16, 2237–2251.
9. (a) Fernández-Santin, J. M.; Aymami, J.; Rodríguez-Galán, A.; Muñoz-Guerra, S.; Subirana, J. A. *Nature (London)* 1984, 311, 53–54. (b) Fernández-Santin, J. M.; Muñoz-Guerra, S.; Rodríguez-Galan, A.; Aymami, J.; Lloveras; J.; Subirana, J. A.; Giralt, E.; Ptak, M. *Macromolecules* 1987, 20, 62–68.
10. (a) Birkofer, L.; Modic, R. *Liebigs Ann. Chem.* 1957, 604, 56. (c) Birkofer, L.; Modic, R. *Liebigs Ann. Chem.* 1959, 628, 162–172.
11. Zilkha, A.; Burstein, Y. *Biopolymers* 1964, 2, 147–161.
12. Kricheldorf, H. α-*Aminoacid-N-Carboxyanhydrides and Related Heterocycles*, Springer-Verlag, 1987.
13. (a) Graf, R.; Lohaus, G.; Börner, K.; Schmidt, E.; Bestian, H. *Angew. Chem.* 1962, 74. 523. (b) Bestian, H. *Angew. Chem.* 1968, 80, 304. (c) Schmidt, E. *Angew. Makromol. Chem.* 1970, 14, 185–202.
14. (a) Rodríguez-Galán, A.; Muñoz-Guerra, S.; Subirana, J. A.; Chuong, B.; Sekiguchi, H. *Makromol. Chem., Macromol. Symp.* 1986, 6, 277–284 (b) López-Carrasquero, F.; Garcia-Alvarez, M.; Muñoz-Guerra, *Polymer*, 1994, 35, 4502–4510 (c) Navas, J. J.; Alemán, C.; López-Carrasquero, F.; Muñoz-Guerra, S. *Macromolecules* 1995, 28, 4487–4494. (d) López-Carrasquero, F.; Alemán, C.; García-Alvarez, M.; Martínez de Ilarduya, A.; Muñoz-Guerra, S. *Macromol. Chem. Phys.* 1995, 196, 253. (e) López-Carrasquero, F.; Montserrat, S.; Martínez de Ilarduya, A.; Muñoz-Guerra, S. *Macromolecules* 1995, 28, 5535–5546. (f) López-Carrasquero, F.; García-Alvarez, M.; Navas, J. J.; Alemán, C.; Muñoz-Guerra, S. *Macromolecules* 1996, 29, 8449–8459. (g) Muñoz-Guerra, S.; López-Carrasquero, F.; Fernández-Santín, J. M.; Subirana, J. A. In *Encyclopedia of Polymeric Materials*, Salamone, J. C., Ed.; CRC Press: Boca Raton, Fla., 1996, 4694–4700. (h) García-Alvarez, M.; Martinez de Ilarduya, A.; León, S.; Alemán, C.; Muñoz-Guerra, S. *J. Phys. Chem. A* 1997, 101, 4215–4223. (i) García-Alvarez, M.; León, S.; Alemán, C.; Campos, J. L.; Muñoz-Guerra, S. *Macromolecules* 1998, 31, 124–134. (j) Ilarduya, A. M.; Alaman, C.; Garcia-Alvarez, M.; López-Carrasquero, F; Muñoz-Guerra, S. *Macromolecules*, 1999, 32, 3257–3263.
15. (a) Eisenbach, C. D.; Lenz, R. W. *Macromolecules*, 1976, 9, 227–230 (b) Eisenbach, C. D.; Lenz, R. W. *Makromol. Chem.*, 1979, 180, 429–440.
16. (a) Hashimoto, K.; Okata, M.; Nagata, S.; *J. Polym. Sci., Part A. Polym. Chem.*, 1995, 33, 1995–1999. (b) Hashimoto, K.; Oi, T.; Yasuda, J.; Hotta, K.; Okata, M. *J. Polym. Sci.*, Part A. *Polym. Chem.*, 1997, 35, 1831–1838. (c) Hashimoto, K.; Yasuda, J.; Kobayashi, M. *J. Polym. Sci.*, Part A. *Polym. Chem.*, 1999, 37, 909–915.
17. Šebenda, J.; Hauer, *J. Polym, Bull.*, 1981, 5, 529.
18. (a) Deming, T. J. *Nature*, 1997, 390, 386–389. (b) Deming, T. J.; Curtin, S. A. *J. Am. Chem. Soc.*, 2000, 122, 5710–5717. (c) Yu, M.; Nowak, A. P.; Pochan, D. P.; Deming, T. J. *J. Am. Chem. Soc.*, 1999, 121, 12210–12211. (d) Cha, J. N.; Stucky, G. D.; Morse, D. E.; Deming, T. J. *Nature*, 2000, 403, 289–292. (e) Deming, T. J. *J. Polym. Sci. Polym. Chem. Ed.*, 2000, 38, 3011–3018. (f) Hwang, J.; Deming, T. J. *Biomacromolecules*, 2001, 2, 17–21.
19. (a) Fetters, L. J. in *Encyclopedia of Polymer Science and Engineering* 2nd Ed., Wiley-Interscience, New York, 1987, 10, 19–25. (b) Webster, O. *Science*, 1991, 251, 887–893.
20. Salzmann, T. N.; Ratcliffe, R. W.; Christense, B. G., Bouffard, F. A. *J. Am. Chem. Soc.* 1980, 102, 6163–6164.
21. García-Alvarez, M.; López-Carrasquero, F.; Tort, E.; Rodriguez-Galán, A.; Muñoz-Guerra, S. *Synth. Commun.* 1994, 24, 745–753.

22. Pangborn, A. B.; Giardello, M. A.; Grubbs, R. H.; Rosen, R. K.; Timmers, F. J. *Organometallics*, 1996, 15, 1518–1520.
23. Curtin, S. A. and Deming, T. J. *J. Am. Chem. Soc.*, 1999, 121, 7427–7428.
24. Feldman, J.; McLain, S. J.; Parthasaranthy, A.; Marshall, W. J.; Calabrese, J. C.; Arthur, S. D. *Organometallics*, 1997, 16, 1514–1516.
25. Bürger, H.; Wannagat, U. *Monatsh. Chem.* 1963, 94, 1007.
26. Alyea, E. C.; Bradley, D. C.; Copperthwaite, R. G. *J. Chem. Soc., Dalton Trans.* 1972, 1580–1584.
27. Burger, H.; Wannagat, U. *Monatsh. Chem.* 1964, 95, 1099.
28. Allan, J. F.; Henderson, K. W.; Kennedy, A. R. *Chem. Commun.* 1999, 1325–1326.
29. Cheng, M.; Attygalle, A. B.; Lobkovsky, E. B.; Coates, G. W. *J. Am. Chem. Soc.* 1999, 121,11583–11584.
30. Chamberlain, B. M.; Cheng, M.; Moore, D. R.; Ovitt, T. M.; Lobkovsky, E. B.; and Coates G. W. *J. Am. Chem. Soc.* 2001, 123, 3229–3238.
31. Lynch, J. K.; Holladay, M. W.; Ryther, K. B.; Bai, H.; Hsiao, C. N.; Morton, H. E.; Dickman, D. A.; Arnold, W.; King, S. A.; *Tetrahedron Assym.*, 1998, 9, 2791–2794.
32. Abele, S.; Guichard, G.; Seebach, D. *Helv. Chim. Acta*. 1998, 81, 2141–2156.
33. Billmeyer, F. W. *Textbook of Polymer Science*, 3rd Ed. John Wiley and Sons, 1984, page 208–219.

What is claimed is:

1. A method of making a poly($\beta$-peptide) comprising, combining a beta lactam monomer and a transition metal complex, said complex comprising a transition metal and a nucleophilic ligand, for a time and under conditions effective to polymerize the beta lactam monomer and to form the poly($\beta$-peptide).

2. The method of claim 1, said poly($\beta$-peptide) having the formula:

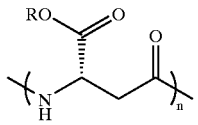

wherein R is hydrogen or an alkyl, aryl, oligo-ethylene glycol monomethyl, or side-chain protecting group and n is about 5 to about 200.

3. The method of claim 2 wherein R is an oligo-ethylene glycol monomethyl moiety having the formula —$(CH_2CH_2O)_nCH_3$, wherein n is one to twenty.

4. The method of claim 2 wherein R is isobutyl.

5. The method of claim 1, wherein the transition, metal is selected from the group consisting of Ni, Co, Cu, Fe, Sc, and Mg.

6. The method of claim 1 wherein the ligand is $N(TMS)_2$, wherein TMS is trimethyl silyl, or an amido amidate (AA), wherein AA is $(NHCH(CH(CH_3)_2)C(O)NH_2C(CH_3)_3)$.

7. The method of claim 1 wherein the transition metal complex is a transition metal amido complex.

8. The method of claim 1 wherein the transition metal complex is selected from the group consisting of $Sc(N(TMS)_2)_3$, $Zn(N(TMS)_2)_2$, $Cr(N(TMS)_2)_3$, $Co(N(TMS)_2)_2$, $Cu(N(TMS)_2)_2$, $Mg(N(TMS)_2)_2$, and $Fe(N(TMS)_2)_3$, wherein TMS is trimethyl silyl.

9. The method of claim 1 wherein the transition metal complex is $BDIMgN(TMS)_2$, or $BDIZnN(TMS)_2$, wherein BDI is 2-((2,6-diisopropylphenyl)amido)-4-((2,6-diidopropylphenyl)imino)-2-pentene) and TMS is trimethyl silyl.

10. The method of claim 1 wherein the transition metal complex is DEPENiAA, wherein DEPE is 1,2-bis (dimethylphosphino)ethane and M is an amido amidate having the formula $NHCH(CH(CH_3)_2)C(O)NH_2C(CH_3)_3$.

11. The method of claim 1 wherein the transition metal complex is $Co(PMe_3)_4$, wherein Me is methyl.

12. The method of claim 1, wherein the transition metal complex is a Ru-amido complex having the formula (para-cymene)$Ru(NHCH_2CH_2NS(O)_2C_6H_5CH_3)$.

13. The method of claim 1, wherein said beta lactam monomer is selected from the group-consisting of (S)-4-(benzyloxycarbonyl)-2-azetidinone, (S)-4-(2-(2-(2-methoxyethoxy)ethoxy)carbonyl-2-azetidinone, and (S)-4-(2-(2-(2(2-methoxyethoxy)ethoxy)ethoxy)ethoxy) carbonyl-2-azetidinone.

14. The method of claim 1, wherein the polymerization of beta lactam monomer is a living polymerization controlled by monomer to initiator stoichiometry.

15. The method of claim 1 wherein the poly($\beta$-peptide) is a homopolymer.

16. A composition of matter comprising a beta lactam monomer and a transition metal complex, said complex comprising a transition metal and a nucleophilic ligand.

17. A composition of matter made by combining a beta lactam monomer and a transition metal complex, said complex comprising a transition metal and a nucleophilic ligand.

18. A composition comprising a poly($\beta$-peptide) made according to claim 1 and another beta-lactam monomer.

19. A poly($\beta$-peptide) having the formula:

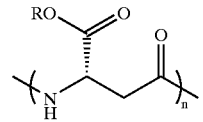

wherein R is an alkyl, aryl, oligo-ethylene glycol monomethyl, or side-chain protecting group and n is about 5 to about 200.

20. The poly($\beta$-peptide) of claim 19 having a polydispersity index of about 1 to about 1.3.

21. The poly($\beta$-peptide) of claim 19 having a molecular weight of about 10,000 to about 250,000.

22. A method of making a metalated lactam comprising, combining a beta lactam monomer and a transition metal complex, said complex comprising a transition metal and a reactive nucleophilic ligand, for a time and under conditions effective liberate a reactive ligand and to form the metalated lactam.

23. The method of claim 22, wherein the transition metal is selected from the group consisting of Ni, Co, Cu, Fe, Sc, and Mg.

24. The method of claim 22 wherein the ligand is $N(TMS)_2$, wherein TMS is trimethyl silyl, or an amido amidate (AA), wherein AA is $(NHCH(CH(CH_3)_2)C(O)NH_2C(CH_3)_3)$.

25. The method of claim 22 wherein the transition metal complex is a transition metal amido complex.

26. The method of claim 22 wherein the transition metal complex is selected from the group consisting of $Sc(N(TMS)_2)_3$, $Zn(N(TMS)_2)_2$, $Cr(N(TMS)_2)_3$, $Co(N(TMS)_2)_2$, $Cu(N(TMS)_2)_2$, $Mg(N(TMS)_2)_2$, and $Fe(N(TMS)_2)_3$, wherein TMS is trimethyl silyl.

27. The method of claim 22 wherein the transition metal complex is $BDIMgN(TMS)_2$, or $BDIZnN(TMS)_2$, wherein BDI is 2-((2,6-diisopropylphenyl)amido)-4-((2,6-diidopropylphenyl)imino)-2-pentene) and TMS is trimethyl silyl.

28. The method of claim 22 wherein the transition metal complex is DEPENiAA, wherein DEPE is 1,2-bis(dimethylphosphino)ethane and M is an amido amidate having the formula $NHCH(CH(CH_3)_2)C(O)NH_2C(CH_3)_3$.

29. The method of claim 22 wherein the transition metal complex is $Co(PMe_3)_4$, wherein Me is methyl.

30. The method of claim 22, wherein the transition metal complex is a Ru-amido complex having the formula (para-cymene)$Ru(NHCH_2CH_2NS(O)_2C_6H_5CH_3)$.

31. The method of claim 22, said metalated lactam having the formula:

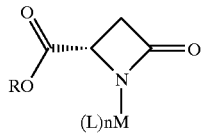

wherein R is an alkyl, aryl, oligo-ethylene glycol monomethyl moiety or side chain protecting group; M is a transition metal, L is a ligand and n is 1, 2 or 3.

32. A composition of matter comprising a beta lactam monomer and a metalated lactam made according to claim 22.

33. A method of making a block copoly (β-peptide) comprising:
combining a first beta lactam monomer and a transition metal complex, said complex comprising a transition metal and a nucleophilic ligand, in a reaction mixture, for a time and under conditions effective to polymerize the first beta lactam monomer and to form a first block of the block copoly (β-peptide); and
adding a second beta lactam monomer to the reaction mixture, wherein the second monomer is different from the first monomer, for a time and under conditions effective to polymerize the second beta lactam monomer and to form a second block of the block copoly (β-peptide).

34. The method of claim 33 wherein the block copoly (β-peptide) is an amphiphilic block copoly (β-peptide), the first block having one or more hydrophilic side chains and the second block having one or more hydrophobic side chains.

35. The method of claim 33 wherein the hydrophilic side chains of the first block are charged or oligo-ethylene glycol functionalized side chains.

36. The method of claim 33, wherein the hydrophobic side chains of the second block are alkyl or aryl esters.

37. A block copoly (β-peptide) comprising a first block and a second block attached to the first block, the first block having ten or more identical first beta amino acid residues and the second block having ten or more identical second beta amino acid residues, wherein the second beta amino acid residues are different than the first beta amino acid residues.

38. The block copoly (β-peptide) of claim 37, which is an amphiphilic block copoly (β-peptide), said first beta amino acid residue having a hydrophilic side group and said second beta amino acid residue having a hydrophobic side group.

39. The block copoly (β-peptide) of claim 37, having a polydispersity index of about 1 to about 1.3.

40. A composition comprising a block copoly (β-peptide) made according to claim 33.

* * * * *